April 20, 1965　　J. C. BRIGHTON ETAL　　3,179,332
REFUSE CONTAINER
Filed Oct. 9, 1963　　　　　　　　　　　3 Sheets-Sheet 1
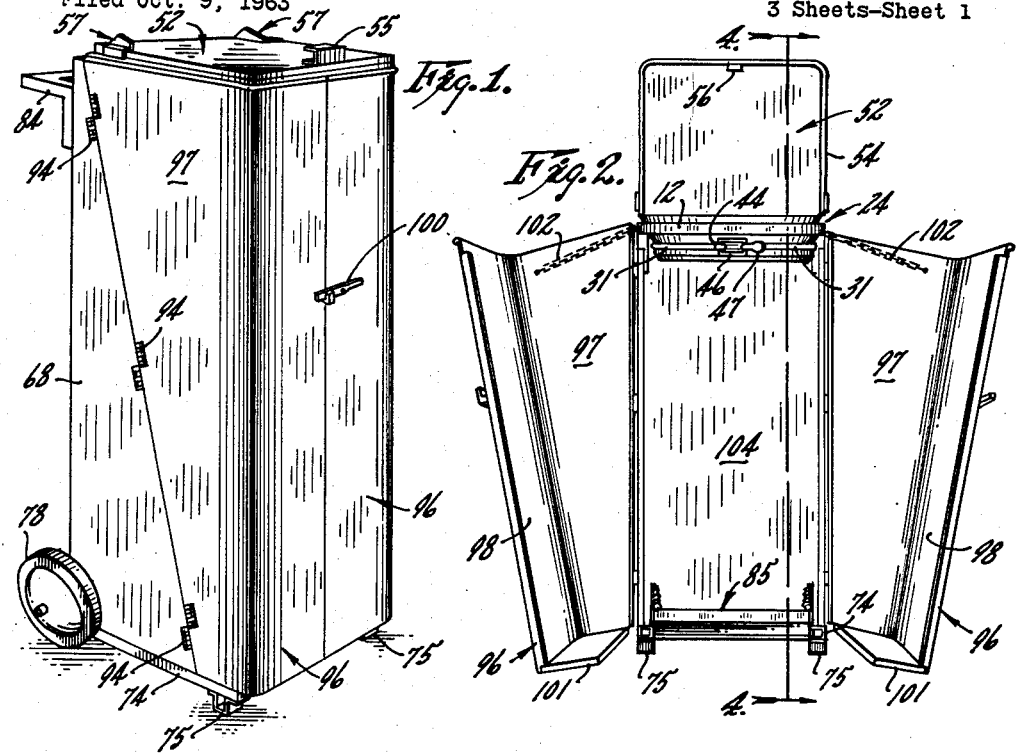
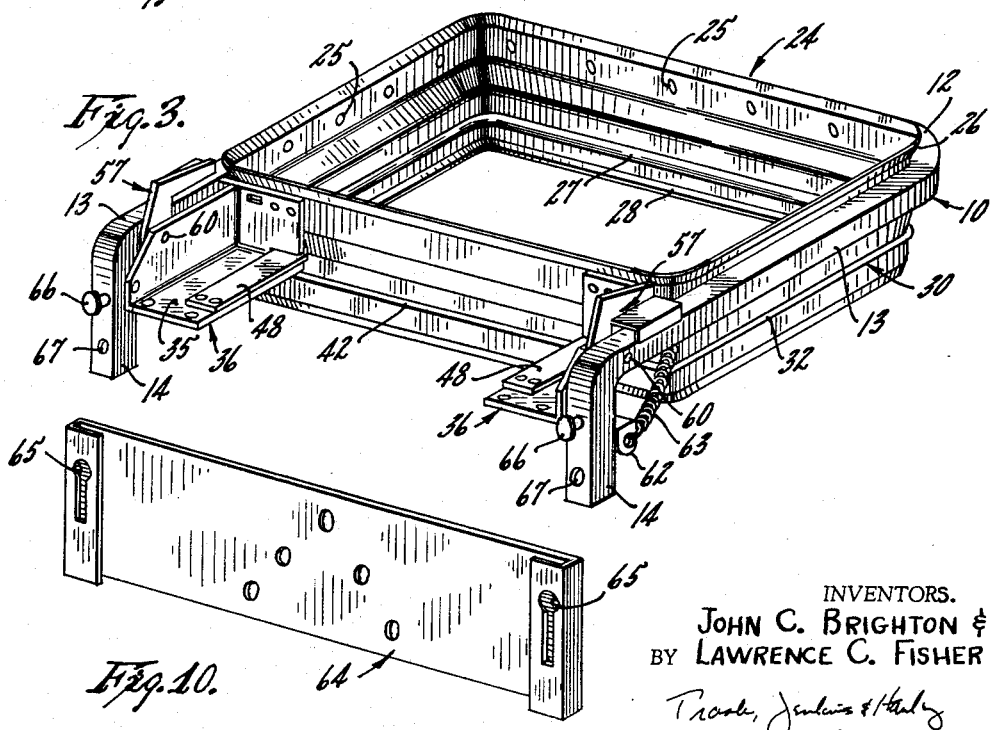
INVENTORS.
JOHN C. BRIGHTON &
BY LAWRENCE C. FISHER
ATTORNEYS.

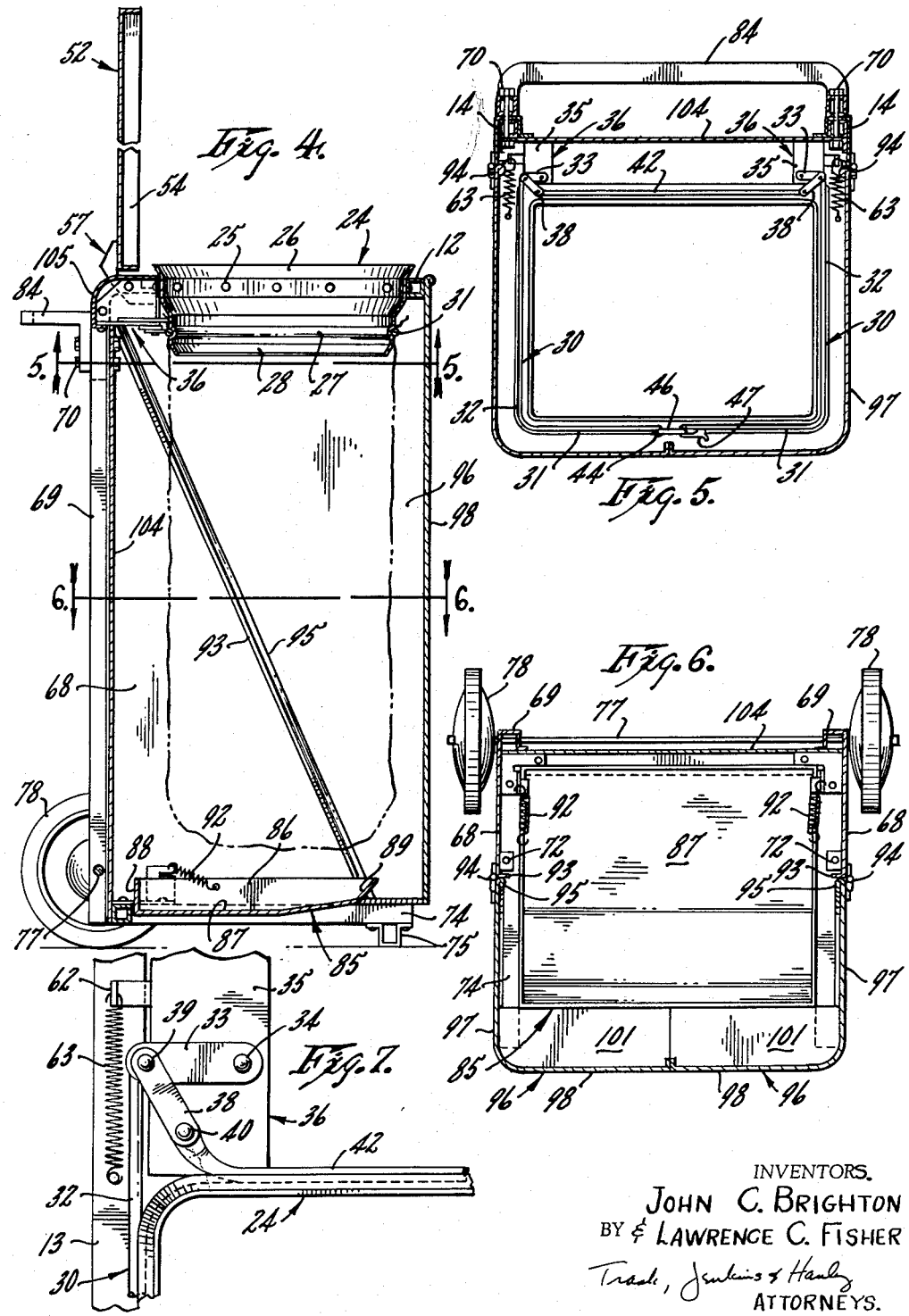

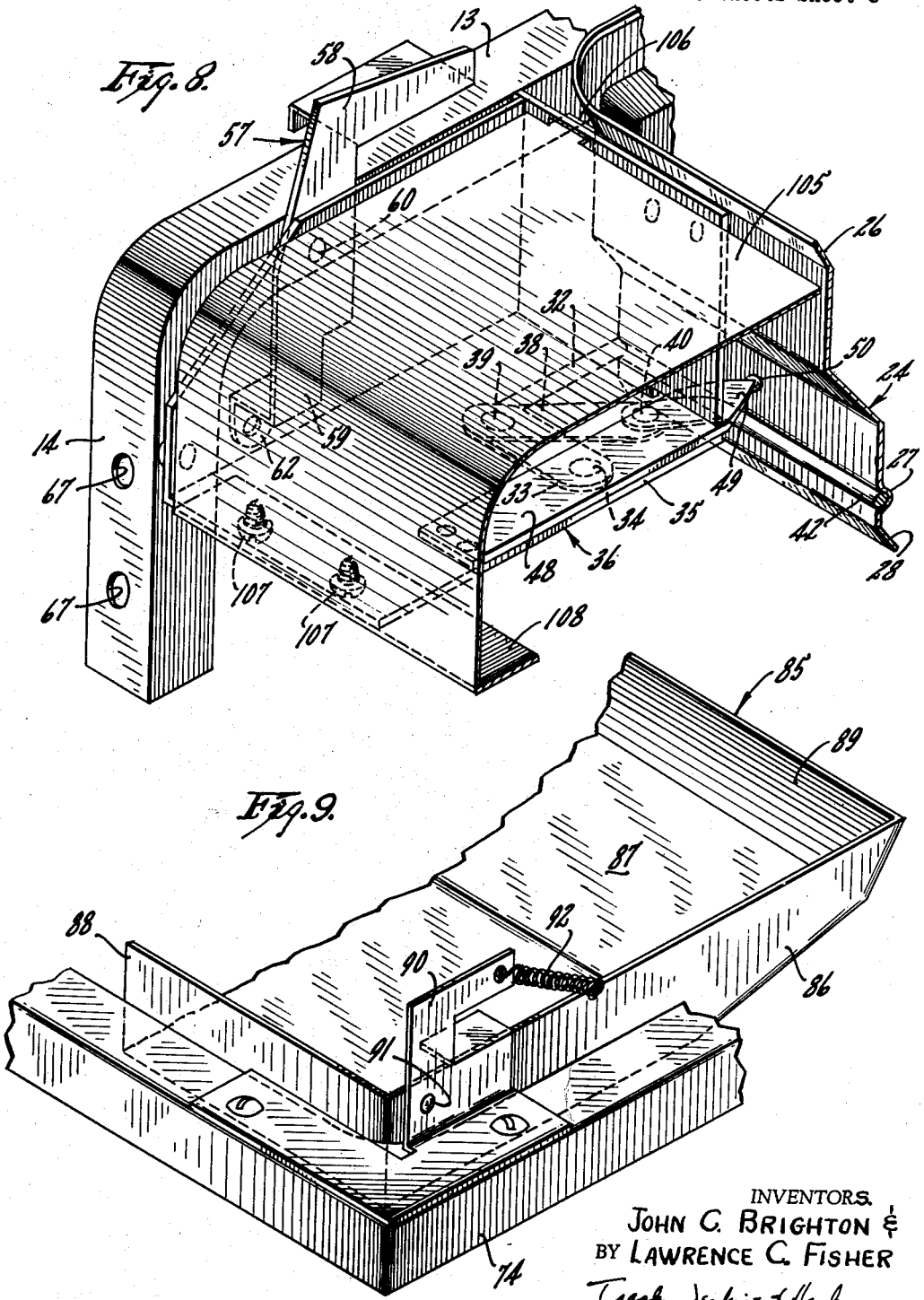

United States Patent Office 3,179,332
Patented Apr. 20, 1965

3,179,332
REFUSE CONTAINER
John C. Brighton and Lawrence C. Fisher, Columbus, Ind., assignors to Arvin Industries, Inc., Columbus, Ind., a corporation of Indiana
Filed Oct. 9, 1963, Ser. No. 315,087
6 Claims. (Cl. 232—43.2)

This application is a continuation-in-part of our prior application Serial No. 229,107, filed October 8, 1962.

The invention relates to a refuse container and more particularly to a refuse container employing a disposable refuse bag.

It is an object of our invention to provide a refuse container of attractive appearance which can be inexpensively manufactured largely from economical sheet-metal and metal-tubing, which can be used in combination with a disposable refuse holding bag, which will securely retain said bag in an open operative position but which will permit said bag to be quickly and easily placed in and removed from said operative position, which will protect said bag from animals, which may be easily moved from one location to another, and which is adapted for shipment and storage in a compact knocked-down condition.

In accordance with the preferred form of our invention, there is provided a frame having a collar provided with a plurality of interconnected side walls mounted thereon. Said collar projects downwardly from the frame for reception in the open end of a disposable refuse bag which is retained thereon by a clamp swingably interconnected to said frame between a closed position in which it bindingly retains said bag against each of the side walls on said collar and an open position out of engagement with said bag to permit said bag to be placed on and removed from said collar. Conveniently, a pair of bag-gripping fingers are also interconnected to said frame by bindingly retaining said bag against said collar until said clamp can be moved into its closed position. A lid is swingably mounted on said frame for movement between a closed position in which it rests on said frame and closes the top of said collar and an open position in which it is generally normal to said frame, and said collar is open for the reception of refuse into the bag supported thereon.

A pair of upright members extend between the frame and a ground-engaging base. Conveniently, a pair of ground-engaging wheels are carried from said upright members and act in combination with said base for supporting the container in a stationary upright position, while permitting the container to be wheeled about when it is tilted rearwardly to swing said base out of engagement with the ground. Said base swingably supports an upwardly open basket spring-biased into a generally horizontal orientation below the bag supported on the collar to catch any refuse or litter that does not get inserted into the bag and any drippings such as grease, or the like, that exit the bottom of said bag.

A back wail extends between the upright members, and a pair of side walls extend forwardly from said upright members. The forward edges of said side walls angle rearwardly upwardly and are swingably connected to the rear edges of a pair of L-shaped doors. Said doors are swingable between a closed position in which they act in combination with said back and side walls to form a bag encircling enclosure and an open position in which said bag is in a position of access. A rearwardly projecting plate is provided along the lower edge of each door and engages said basket when the doors are closed to act in combination with said basket for enclosing the bottom of the container.

Other objects and features of our invention will become apparent from the more detailed description which follows and from the accompanying drawings, in which:

FIG. 1 is a perspective view of a refuse container embodying our invention;

FIG. 2 is a front view of the refuse container shown in FIG. 1, but showing the doors and lid in open positions;

FIG. 3 is an enlarged perspective view of the upper frame for our container, but showing the lid removed therefrom;

FIG. 4 is an enlarged vertical section taken on the line 4—4 of FIG. 2, but showing the doors in closed position;

FIG. 5 is a horizontal section taken on the line 5—5 of FIG. 4;

FIG. 6 is a horizontal section taken on the line 6—6 of FIG. 4;

FIG. 7 is an enlarged fragmentary bottom plan view of a portion of the bag holding clamp;

FIG. 8 is an enlarged fragmentary perspective view of the upper frame shown in FIG. 3;

FIG. 9 is an enlarged fragmentary perspective view of the basket mounting; and

FIG. 10 is a perspective view of a mounting plate for the upper frame shown in FIG. 3.

As shown in the drawings, our container is formed from an upper frame comprising a length of metal-tubing bent into generally U-shape. The tubing 10 comprises a transversely extending bight 12 interconnecting a pair of legs 13 turned downwardly at their ends, as at 14. A generally rectangular collar 24 is mounted on the inwardly presented faces of the bight 12 and legs 13 by a plurality of screws 25. As shown in the drawings, the collar projects above and below the plane of the frame and is provided along its upper edge with an outwardly projecting peripheral lip 26. Below the frame the collar 24 has a peripherally extending outwardly open bead 27 intermediate said frame and the lower inwardly angled edge 28 of said collar.

The collar 24 is adapted to be received in the open end of a disposable refuse bag (shown in phantom in FIG. 4). To support said bag in an upwardly open position thereon, we provide a clamp assembly comprising a pair of L-shaped rods 30 each of which has a leg 31 extending partially across the forwardly presented face of the collar 24 and a rearwardly extending leg 32 extending along one side of said collar. Each of the legs 32 projects rearwardly of the collar and is integral with a flattened extension 33 normal to said leg and swingably connected by a pin 34 to the floor 35 of a bracket 36 mounted on the inwardly presented face of one of the frame legs 13. A link 38 is swingably connected at one of its ends to the extension 33 by a pin 39 and is swingably connected at its opposite end by a pin 40 to a transversely extending rod 42 disposed below the plane of the frame bight 18. The rods 30 and 42 lie in the horizontal plane of the collar bead 27 and, as shown in FIG. 2, one of the rods 30 is provided at its end remote from its extension 33 with a hook 44 adapted to receive a loop 46 swingably mounted on a locking handle 47 swingably mounted on the adjacent end of the other clamp rod 30 for thus locking the clamp rods 30 and 42 in the bead 27 for retaining a bag around the collar 24. When the loop 46 is disengaged from the hook 44, and the two clamp rods 30 are swung outwardly about the axes of the pivot pins 34 to dispose said rods in spaced relation to the collar 24, the links 38 will swing about the axes of the pins 39 and 40 to swing the rod 42 rearwardly out of engagement with the back face of the collar 24 to thus permit a bag to be inserted on or removed from the collar 24. Conversely, as the rods 30 are swung inwardly about the axes of the pins 34, the links 38 will again swing about the axes of the pins 39 and 40 to force the rod 42 into engagement with the collar bead 27 extending across the rear wall of the collar for bindingly retaining the rear edge of a bag between said rod 42 and collar. With the pair of rods 30 swung into their closed position in which they are adapted to bindingly retain three sides of the bag against the collar 24, the handle 47 may be swung into position to cause its loop 46 to lock over the hooked rod end 44 for thus bindingly retaining the entire assembly against the bag supported on the collar.

In order to retain a bag on the collar 24 until the clamp rods 30 and 42 can be moved into closed position, we mount a gripping finger 48 on the floor 35 of each of the brackets 36. As shown in FIG. 8, each of the fingers 48 has a pointed end 49 which projects forwardly of its bracket 36 into engagement with a dimple 50 formed in the back face of the collar 24. The fingers 48 are formed from spring steel so that as the bag is lifted upwardly along the rear face of the collar 24 said fingers will bend upwardly to permit the upper back edge of the bag to clear said fingers and take a position between said fingers and the adjacent collar face. When such lifting effort is removed from the bag, the weight of said bag and the inherent resiliency of the fingers 48 will cause said fingers to bend downwardly with their forwardly presented ends 49 bindingly retaining the bag between the fingers and the dimples 50 for thus retaining the bag on the collar 24 until the clamp rods 30 and 42 can be moved into their closed locked position. Upon movement of the clamp rods 30 and 42 into open positions, the weight of the refuse in the bag will cause said bag to tear off of the fingers 49 and drop off of the collar.

In order to close the top of the collar 24, we provide a lid 52 conveniently formed as a sheet-metal stamping and provided with a downwardly projecting peripheral skirt 54. A handle 55 and spring catch 56 of any suitable construction are mounted on the forward edge of the lid, said catch engaging the collar lip 26 upon lid closing for releasably retaining said lid in closed position. The lid 52 is swingably interconnected to the frame legs 13 by a pair of hinges 57, each of which has an arm 58 extending over the rear edge of said lid and rigidly connected to the upper face thereof. The arm 58 is normal to a second arm 59 projecting downwardly between the adjacent leg 13 and bracket 36 and swingably connected to the leg 13 by a hinge pin 60. As shown in FIG. 3, the end of the arm 59 remote from the arm 58 is provided with an outwardly offset, downwardly projecting finger 62 in which one end of a coil spring 63 is received, the opposite end of said spring being connected to the leg 13 forwardly of the hinge pin 60. Thus, as the lid 52 is swung about the axis of the pins 60 into a closed position in which the skirt 54 rests upon the upwardly presented faces of the frame legs 13 and bight 12, the springs 63 will be in compression. However, a lifting effort applied to the handle 55 will cause the catch 56 to disengage from the collar lip 26, and the springs 63 will swing the lid 52 into its open position shown in FIG. 9.

The portion of our invention already described may be mounted on a wall, post, or any other suitable support as a completed unit for supporting a refuse bag. To effect such mounting, a plate 65 as illustrated in FIG. 10 may be employed. As shown, the plate 64 is provided with a pair of key-hole slots 65 at each of its ends in which studs 66 removably mounted in the openings 67 in the downturned frame leg portions 14 may be received. The plate 64 can be connected to any suitable supporting structure by fastening means extending through openings formed in said plate.

However, to employ our refuse container as a self supporting unit, the collar, lid and frame assembly are carried upon a plurality of vertically extending wall structures. To this end, we provide a pair of side walls 68 conveniently formed from sheet-metal and having their rear edges bent into a channeled configuration to form a pair of upright members 69 in which the lower ends of the frame leg portions 14 are telescopically received and connected, as by bolts 70 extending through the openings 67 and openings in the members 69. The side walls 68 extend downwardly and have their lower ends rigidly connected, as by bolts 72, to a rectangularly shaped base 74 provided with a transverse ground-engaging foot 75 along its forward edge. An axle 77 extends transversely through openings in the upright members 69 and a pair of wheels 78 are mounted thereon outside the lateral extent of the side walls 68. The foot 75 and wheels 78 project below the lower edges of the side walls 68 and support the container in an upright position, while permitting said container to be easily moved from one location to another on the wheels 78 when it is tilted rearwardly to dispose the foot 75 out of engagement with the ground. To facilitate such movement of the container, a generally U-shaped handle 84 is mounted on the upright members 69, as by the bolts 70.

As shown in FIG. 4, a basket 85 is mounted on our container in vertical alignment with the collar 24 and the bag supported thereon. Conveniently, the basket 85 comprises a pair of opposed side walls 86 interconnected by a floor 87, back wall 88, and front wall 89. The forward end of the floor 87 terminates rearwardly of the front edge of the frame bight 12, and the front basket wall 89 slopes forwardly with its forwardly presented upper edge lying in vertical alignment with the forwardly presented face of the frame bight 12. As shown in FIG. 9, a hinge plate 90 is mounted on the base 74 at each of its rear corners and projects upwardly therefrom for connection to the adjacent basket side wall 86 by a hinge pin 91 to permit the forward portion of the basket 85 to swing downwardly about the axis of the pins 91 when the refuse bag is dropped into it after release of the clamp rods 30 and 42 so that said bag can be easily slid and lifted out of said basket. The basket is releasably retained in its normal horizontal orientation by springs 92 connected to the hinge plates 90 and basket side walls 86.

As shown in FIG. 4, the forward edges of the side walls 68 are angled obliquely rearwardly from points intermediate the length of the base 74 to the rear edge of the upper frame 10. Said forward edges are bent inwardly, as at 93, to stiffen said side walls and are swingably connected by hinges 94 to the rolled rear edges 95 of a pair of L-shaped sheet-metal doors 96. As shown, each of the doors has a lateral section 97 integral with and normal to a front section 98. When the doors are closed, the sections 97 act in combination with the side walls 68 to enclose the sides of the container, and the front sections abut each other to enclose the front of the container. The front sections 98 may be provided with any suitable latch construction 100 for latching the doors in closed position. A rearwardly projecting plate 101 is mounted along the lower edge of each of the doors 96 and engages the lower face of the basket 85 when the doors are closed to help support said basket in its horizontal orientation and to act in combination with said basket to enclose the bottom of the container. With the doors 96 connected to the side walls 68 on the oblique axis of the hinges 94, said doors will move by gravity into their open position shown in FIG. 2. Conveniently, chains 102 are connected to the doors 96 and frame 10 for limiting the opening movement of said doors.

The back of the container is closed by a back wall comprising a panel 104 and shield 105. The panel 104, which is rigidly connected to the upright members 69, extends upwardly from the base 74 to the transversely extending arcuate shield 105 enclosing the upper rear portion of the container. As shown in FIG. 8, the shield 105 is interposed between the rear portion of the frame legs 13 and curved downwardly and rearwardly over the brackets 36. The shield 105 is mounted on the container by tabs 106 projecting outwardly from its edge and received in slots formed in the front walls of the brackets 36 and by screws 107 interconnecting the bracket floors 35 and the flanged rear shield edge 108. Thus, with the doors 96 and side walls 68, and the panel 104 and shield 105 extending between the base 74 and frame 10, all of the several sides of the container will be completely enclosed when the doors 96 are closed. And, with said doors in closed position, the plates 101 engage the basket 85 and act in combination therewith to enclose the bottom of the container.

We claim:

1. In a refuse container,
    (a) a ground-engaging base,
    (b) a pair of laterally spaced upright members interconnected to the base at the rear thereof,
    (c) a frame mounted on the upper ends of said upright members,
    (d) a generally rectangularly shaped collar mounted on said frame and receivable in the open end of a refuse bag,
    (e) clamp means swingably interconnected to said frame and movable between an open position in spaced relation to said collar and a closed position disposed immediately adjacent said collar for bindingly retaining said bag thereon,
    (f) a lid carried on said frame for closing said collar,
    (g) a basket mounted on said base,
    (h) a back wall connected to said upright members and extending between said frame and basket,
    (i) a pair of side walls extending forwardly from said upright members along a pair of opposed sides of the container between said frame and basket, the forward edges of said side walls angling upwardly and rearwardly from points intermediate the length of said base, and
    (j) a pair of L-shaped doors extending between said frame and basket and having rearwardly angled rear edges swingably connected to said forward edges of the side walls for movement between a closed position in which they act in combination with said back and side walls to form a bag encircling enclosure and an open position in which said bag is disposed in a position of access.

2. A refuse container as set forth in claim 1 in which
    (a) said side walls are formed from sheet-metal with their rear edges bent into a channeled configuration to form said pair of upright members.

3. A refuse container as set forth in claim 1 with the addition that
    (a) said base is provided with a ground-engaging foot adjacent its forward edge,
    (b) a transversely extending axle is mounted on said upright members, and
    (c) a pair of wheels are mounted on said axle outside the lateral extent of said side walls, said wheels and foot supporting said container in position to dispose said doors out of contact with the ground.

4. In a refuse container,
    (a) a ground-engaging base,
    (b) a pair of laterally spaced upright members interconnected to the base at the rear thereof,
    (c) a frame mounted on the upper ends of said upright members,
    (d) a generally rectangularly shaped collar mounted on said frame and receivable in the open end of a refuse bag,
    (e) clamp means swingably interconnected to said frame and movable between an open position in spaced relation to said collar and a closed position disposed immediately adjacent said collar for bindingly retaining said bag thereon,
    (f) a lid carried on said frame for closing said collar,
    (g) a basket swingably connected adjacent its rear edge to the base on a transverse axis, said basket having a plurality of interconnected upwardly projecting side walls with its front side wall being angled forwardly,
    (h) a back wall connected to said upright members and extending between said frame and basket,
    (i) a pair of side walls extending forwardly from said upright members along a pair of opposed sides of the container between said frame and basket, the forward edges of said side walls angling upwardly and rearwardly from points intermediate the length of said base, and
    (j) a pair of L-shaped doors extending between said frame and basket and having rearwardly angled rear edges swingably connected to said forward edges of the side walls for movement between a closed position in which they act in combination with said back and side walls to form a bag encircling enclosure and an open position in which said bag is disposed in a position of access,
    (k) each of said doors having a rearwardly projecting plate along its lower edge engageable with said basket when the doors are closed to act in combination with said basket for enclosing the bottom of the container.

5. A refuse container as set forth in claim 4 in which,
    (a) spring means are interconnected between said frame and basket for releasably retaining said basket in a generally horizontal orientation.

6. A refuse container as set forth in claim 5 with the addition that,
    (a) said plates are received under the forward portion of said basket when said doors are closed to help support said basket in said generally horizontal orientation.

No references cited.

FRANK B. SHERRY, *Primary Examiner.*